(12) United States Patent
Hassel (10) Patent No.: US 10,372,804 B2
(45) Date of Patent: Aug. 6, 2019

(54) INTERACTIVE AUDIO VALIDATION/ASSISTANCE SYSTEM AND METHODOLOGIES

(71) Applicant: Bruce Hassel, Cincinnati, OH (US)

(72) Inventor: Bruce Hassel, Cincinnati, OH (US)

(*) Notice: Subject to any disclaimer, the term of this patent is extended or adjusted under 35 U.S.C. 154(b) by 0 days.

(21) Appl. No.: 15/596,701

(22) Filed: May 16, 2017

(65) Prior Publication Data

US 2017/0336933 A1 Nov. 23, 2017

Related U.S. Application Data (60) Provisional application No. 62/337,641, filed on May 17, 2016.

(51) Int. Cl.
*G06F 17/24* (2006.01)
*G06F 9/451* (2018.01)
(Continued)

(52) U.S. Cl.
CPC .......... *G06F 17/243* (2013.01); *G06F 3/0481* (2013.01); *G06F 3/0484* (2013.01);
(Continued)

(58) Field of Classification Search
CPC ...... G06F 3/167; G06F 3/04895; G06F 9/453; G06F 17/243; G06F 17/2725
See application file for complete search history.

(56) References Cited

U.S. PATENT DOCUMENTS 6,587,822 B2 7/2003 Brown et al.
6,721,781 B1 4/2004 Bates et al.
(Continued)

FOREIGN PATENT DOCUMENTS

EP 1 122 636 A2 8/2001
EP 1 295 218 A1 3/2003
(Continued)

OTHER PUBLICATIONS

VOICECORP; ReadSpeaker formReader; http://www.readspeaker.com/readspeakerformreader; May 18, 2010; 2 pages.
(Continued)

*Primary Examiner* — Nicholas Ulrich
(74) *Attorney, Agent, or Firm* — Barnes & Thornburg LLP (57) ABSTRACT

An interactive audio validation and assistance system and methodologies utilize a user interface to receive input to fill the one or more fields to perform a request, wherein the one or more fields contain required information. Validation of the input is performed to determine whether required information is complete for the one or more input fields. In response to the validation determining that required information is incomplete, a notification is output that required information is missing or in an incorrect format for at least one of the one or more input fields, wherein the notification includes audible explanatory instructions facilitating input of missing/incorrect format information. Additionally, systems and methodologies offer auto-fill, tips, suggestions, explanations, other information and a method to replace a website's input error notification system by the user's browser, offering audio and or text assistance to implement more efficient completion of website forms.

16 Claims, 5 Drawing Sheets

(51) Int. Cl.
*G06F 17/27* (2006.01)
*G06F 3/0484* (2013.01)
*G06F 3/16* (2006.01)
*G06F 3/0481* (2013.01)

(52) U.S. Cl.
CPC .............. *G06F 3/167* (2013.01); *G06F 9/453* (2018.02); *G06F 17/2725* (2013.01)

(56) References Cited

U.S. PATENT DOCUMENTS

| | | | |
|---|---|---|---|
| 6,834,264 B2 | 12/2004 | Lucas et al. | |
| 6,882,974 B2 | 4/2005 | James et al. | |
| 6,885,736 B2 | 4/2005 | Uppaluru | |
| 7,003,464 B2 | 2/2006 | Ferrans et al. | |
| 7,124,085 B2 | 10/2006 | Junqua et al. | |
| 7,197,462 B2 | 3/2007 | Takagi et al. | |
| 7,424,429 B2 | 9/2008 | Nakagawa et al. | |
| 7,457,281 B1* | 11/2008 | Migimatsu | H04L 29/1216 370/352 |
| 7,516,070 B2 | 4/2009 | Kahn | |
| 7,644,350 B2 | 1/2010 | Piersol | |
| 7,685,522 B1 | 3/2010 | Feuerman | |
| 7,736,117 B2 | 6/2010 | Ativanichayaphong et al. | |
| 7,865,477 B2 | 1/2011 | Larcheveque et al. | |
| 8,214,362 B1* | 7/2012 | Djabarov | G06F 17/243 707/713 |
| 8,543,404 B2 | 9/2013 | Moore et al. | |
| 8,718,242 B2 | 5/2014 | Bangalore et al. | |
| 8,782,518 B2 | 7/2014 | Caraher et al. | |
| 8,942,986 B2 | 1/2015 | Cheyer et al. | |
| 8,949,902 B1* | 2/2015 | Fabian-Isaacs | H04N 21/439 725/52 |
| 9,171,539 B2 | 10/2015 | Funyak et al. | |
| 9,256,854 B2 | 2/2016 | Callaghan et al. | |
| 9,257,020 B2* | 2/2016 | Bender | G06F 21/554 |
| 9,288,321 B2* | 3/2016 | Pujari | G06F 3/0481 |
| 2002/0184002 A1 | 12/2002 | Galli | |
| 2004/0025115 A1 | 2/2004 | Sienel et al. | |
| 2004/0186713 A1 | 9/2004 | Gomas et al. | |
| 2009/0282345 A1 | 11/2009 | Smith et al. | |
| 2010/0313112 A1 | 12/2010 | Hardt | |
| 2012/0116778 A1 | 5/2012 | Fleizach et al. | |
| 2014/0122989 A1 | 5/2014 | Eigner et al. | |
| 2015/0149168 A1 | 5/2015 | Stent et al. | |
| 2015/0363376 A1* | 12/2015 | Anderson | G06F 17/243 715/224 |
| 2015/0364132 A1 | 12/2015 | Goussard et al. | |
| 2016/0062971 A1 | 3/2016 | Thakker | |
| 2017/0206096 A1* | 7/2017 | Lubow | G06F 17/243 |

FOREIGN PATENT DOCUMENTS

| | | |
|---|---|---|
| WO | 2011004000 A2 | 1/2011 |
| WO | 2015084141 A1 | 6/2015 |

OTHER PUBLICATIONS

VOICECORP; ReadSpeaker formReader Offers Interactive Voice Assistance When Filling Out Online Formas; http://www.readspeaker.com/readspeakerformreaderoffersinteractivevoiceassistancewhenfillingoutonlineforms#; May 18, 2010; 2 pages.

PR Newswire; Inclusite Plans to Change the Internet Experience; http://www.prnewswire.com/news-releases/inclusite-plans-to-change-the-internet-experience-300088691.html; May 26, 2015; 3 pages.

Joomla; Screen Reader with Font Size and High Contrast; https://extensionsjoomla.org/extension/screen-reader/; Feb. 19, 2015; 6 pages.

Hudson, Roger; Accessible Forms 2: Required Fields and Extra Information; http://usability.com.au/2013/05/accessible-forms-2-required-fields-and-extra-information/; May 11, 2013; 15 pages.

W3C Community Group Final Report; Web Speech API Specification; https://dvcs.w3.org/hg/speech-api/raw-file/tip/speechapi.html#tts-section; October 19, 2012; 27 pages.

International Search Report and Written Opinion for PCT/US2017/032895, dated Jul. 18, 2017.

* cited by examiner

INTERACTIVE AUDIO VALIDATION/ASSISTANCE SYSTEM AND METHODOLOGIES

CROSS-REFERENCE AND PRIORITY CLAIM

The present application claims priority to U.S. Provisional Application 62/337,641 filed May 17, 2016, the disclosure of which being incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document, or the patent disclosure, as it appears in the Patent and Trademark Office patent file or records, but otherwise reserves all copyright rights whatsoever.

FIELD

Disclosed embodiments pertain to assistive technology for input and/or validation of on-line form fields on websites accessible via the Internet and/or an Intranet.

BACKGROUND

Conventionally, various techniques have been provided to guide or instruct users to fill out data fields included on websites on the Internet, e.g., on-line form fields, to conduct business and/or personal business and/or transactions over the Internet. However, to date, such techniques are at least frustrating to users and, at most, inoperable, given the variety of errors that can occur when filing out such forms, which have required formats and/or content requirements for each field. Often the user has not inputted the correct information in a field and can't determine which field is preventing him from continuing.

SUMMARY

Conventionally, when a user has reached an impasse in filling out such a form, they are directed to a customer service telephone number so he can receive help in completing the form. Often though, the user's frustration will cause him to abandon the site and go on to a competing website. This is especially problematic if the user is looking for help after the customer service department is closed. This is borne out by the fact that 69.23% (is the) average documented online shopping cart abandonment rate (https://baymard.com/lists/cart-abandonment-rate). The IAVAT technology has been proven to drastically decrease shopping cart abandonment.

However, such a configuration for enabling completion of on-line forms is inefficient and unnecessarily expensive, depending on call center personnel to assist users in completing on-line forms.

Disclosed embodiments provide Interactive Audio Validation/Assistance Technology (IAVAT) that enables an interactive website add-on, which can be toggled on and off by a user visiting the website.

With or without conventional, commercially available screen reader technology, disclosed embodiments may provide users, e.g., website visitors, with audio instructions, explanations, prompts and/or suggestions for completion of required data fields. The instructions are most helpful in response to an initial determination that at least one required data field includes insufficient data to permit further operations.

While most websites will provide a text "error message" indicating which required data field includes insufficient data, that text message often appears at the top of the web page or is not easily identified by the user, especially on devices with smaller screens such as mobile phones or tablets. This is especially problematic for longer forms (i.e., insurance, applications, etc.) wherein the user may be entering information at the bottom of his screen but the "error message" it output in a location out of view, e.g., at the top of the screen.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

In accordance with disclosed embodiments, audio instructions, explanations, prompts and/or suggestions for completion of required data fields may be output to a user, e.g., website visitor. These may be in response to an initial validation operation that determines that at least one required data field includes insufficient data to permit further operations. Some may also be output at other times while a user is on a website. Such audio output may be in the form of pleasant, pre-recorded audio. As used in this explanation, the pre-recorded audio is tied to specific lines of code in a website, the word "validate" in all of its forms refers to checking the appropriateness of a user's input in a required field. An application and/or extension may be provided for IAVAT for installation by users. The user can install the application independently or may be prompted to install it when he encounters a website which uses the IAVAT technology. During installation, the application may query the user for permission to automatically turn the user's device speaker volume on, if off, or adjust the device's speaker volume when the user is on a site which uses the IAVAT technology. The user may also be allowed to select a default percentage for the volume adjustment. Additionally, the user may be able to select several defaults such as language, location and other selections available within the IAVAT technology.

The application may also enable the user to store his commonly used information (e.g., name, address, phone, email, credit card info, etc). After installation, when the user visits a website which uses the IAVAT technology his volume will be adjusted to his selection during the application installation and his information can be pre-filled. This implementation may provide increased utility relative to conventional "auto fill" technologies because this implementation may work with any browser, unlike other browser dependent "auto fill" systems.

The application may also enable the website to determine if the user has visited the website previously but not completed the form. The website may then pre-fill the form information where the user left off on his last visit. The application may also enable the user to select an option which overrides the website's existing text error notification and replaces it with an IAVAT-text notification. For example, an IAVAT-text notification may appear for approximately one second and fill a large portion at the bottom of the a displayed screen for larger devices such as desktop or laptops. Likewise, on devices with smaller screens, such as mobile phones, the IAVAT-text notification may fill the entire screen.

Various technical features and utility are provided in accordance with the disclosed embodiments. For example, validation of a user's input in required fields decreases the user's frustration and increases conversions or completions by eliminating the user's "guesswork" as to why a submission/entry cannot be completed. Conventional technology may provide a user with a tone in response to an unvalidated field but he may not see an accompanying text message to explain what is necessary; alternatively, a displayed text message may be too general to provide meaningful direction, e.g. "Missing Data."

To the contrary, if a user's input in a specific field is not validated (e.g., "phone" input is not a valid 10 digit number, "email" input is not a valid email address) then the user may be prompted by an audio, specific to the field that did not validate (e.g., "Your phone number is not in the correct format, "Your email is incomplete," etc.). The audio may also be preceded by a tone.

Implementation of technology features provided in accordance with the disclosed embodiments may increase user satisfaction by addressing issues and questions that might otherwise require a phone call from the user to a customer service agent, which may, in turn require a wait/hold time, thereby increasing frustration. Additionally, if the user is seeking help after business hours his frustration is amplified and will likely lead to abandonment of the website. Disclosed embodiments can also provide users with tips and suggestions based on previously input data, for example, proper place names such as city streets, cities, counties, etc. (e.g., "Are you sure about this spelling?"). By making the website easier for the user, some unnecessary calls to the website operator can be eliminated, saving the website operator time, money and decreasing website abandonment.

Further, implementation of technology features may increase average sale amount by providing the opportunity to market additional product or associated services. (e.g., "Would you like to double your order for only $xx more?", "Would you rather have air shipping than the ground shipping you selected?")

Additionally, implementation of the technology features may enable assistance of sight impaired users. A website designed for this purpose may use the disclosed embodiments to produce pre-recorded audio, explaining each page. The user may then be prompted to action on each page for, for example, completing only one input field (at a time). The response to that input field may not require the user to place their curser anywhere but rather just type or speak (e.g., if voice recognition is enabled) their response to input the missing required data. That response may then be validated as described above. Subsequently, the user may be directed to the next field on the page requiring further input, a next page requiring input, etc.

The website operator may also choose to allow users to use screen reader technology explaining each page instead of the pre-recorded audio, however, features of the disclosed embodiments may still be used to validate the user's input. In accordance with at least some implementations, the technology is adaptable to any spoken language and virtually any programming language or protocol.

In accordance with at least some disclosed embodiments, significant benefit for users of mobile devices may be provided wherein the required information in a field is often difficult to determine because of the size of the user's screen. In accordance with at least some disclosed embodiments, the user may be directed to the required fields in the order in which they are to be entered. The output audio may indicate the information required to be entered in that field (e.g., "Enter your first and last name", "Enter your phone number", etc.). The user's input may then be validated as described above. In at least one implementation, in response to completion of a first required field (and validation of that field), the cursor can automatically be moved to the next required field and the cycle may continue until all required fields have been validated. Such an implementation may have particular technical utility for websites that are not completely "mobile friendly" because disclosed embodiment functionality may be much easier and cheaper for the site's operator to implement than 100% "mobile friendliness."

Figure 1:
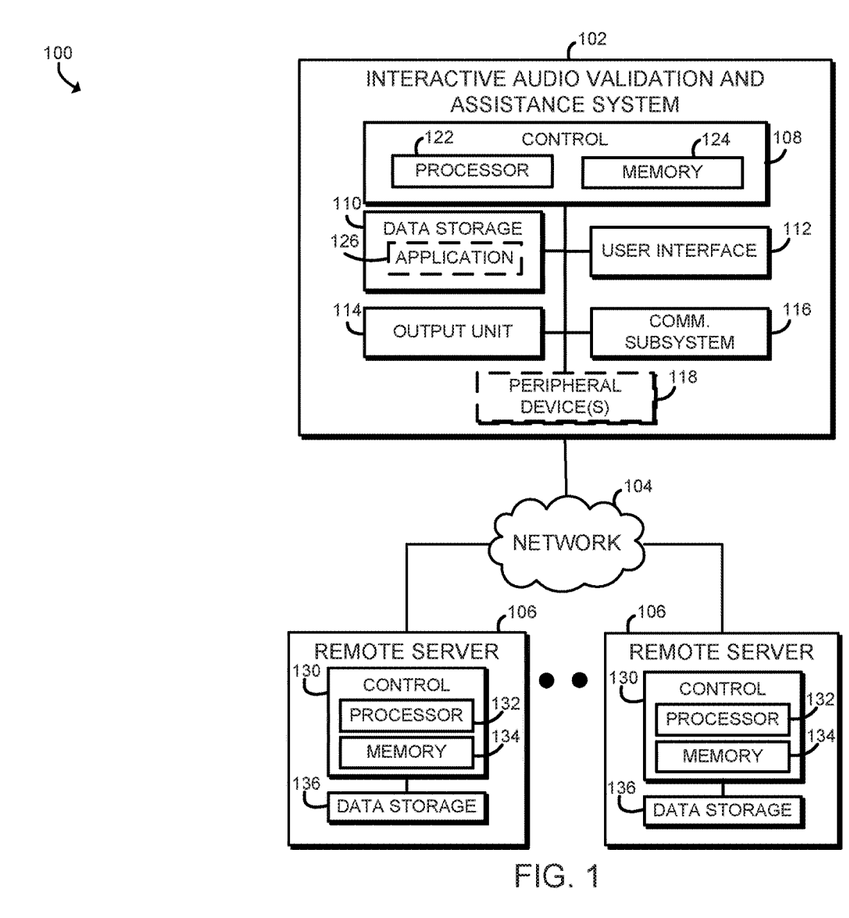
FIG. 1 illustrates one example of interactive audio validation and assistance technology that comprises an interactive audio validation and assistance system coupled to at least one remote server.

As explained in connection with the block diagram illustrated in FIG. 1, one implementation of the disclosed embodiments of IAVAT 100 may include an interactive audio validation and assistance system 102 coupled, e.g., wired or wirelessly, to a network 104, which may be coupled directly or indirectly to the interactive audio validation and assistance system 102 to a plurality of remote servers 106. This allows for the interactive audio validation and assistance system (IAVAS) 102 to connect to websites that may be hosted on one of the plurality of remote servers 106. It should be understood that the IAVAT, implemented as a technology present and utilized at least partially in an environment that includes publically accessible communication networks, as illustrated in FIG. 1, includes and provides functionality implemented using hardware and software coupled to, interfacing and communicating with that environment. That software and hardware may be implemented, in at least one embodiment as the IAVAS, in various figures, illustrated as IAVAS 102.

The Interactive Audio Validation and Assistance System (IAVAS) 102 may be embodied as a general computing device 102. For example, the IAVAS 102 may be embodied as smartphone, tablet, laptop, desktop, notebook, or other computing device capable of performing the functions described herein. As shown in FIG. 1, the IAVAS 102 may include a controller 108, a data storage 110, a user interface 112, an output unit 114, and a communication system 116. In some embodiments, the IAVAS 102 may further include peripheral device(s) 118. In other embodiments, the IAVAS 102 may further include other or additional components, such as those commonly found in a conventional computing device (e.g., various input/output devices and/or other components). In addition, in some embodiments, one or more of the illustrative components may be incorporated in, or otherwise form a portion of, another component. For example, the output unit 114 may be incorporated into the user interface 112.

The controller 108 may be embodied as any type of device or collection of devices capable of performing various computer functions as described herein. In some embodiments, the controller 108 may be embodied as a single device such as an integrated circuit, an embedded system, a Field-ProGrammable-Array (FPGA, a system-on-a-chip (SOC), or other integrated system or device. In some embodiments, the controller 108 includes or is embodied as a processor 122 and memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the IAVAS 102 such as operating systems, applications, programs, libraries, and drivers. The memory 124 may be communicatively coupled to the processor 122. The controller 108 may be communicatively coupled to the data storage 110, user interface 112, output unit 114, communication system 116, and peripheral device(s) 118.

The data storage 110 may be embodied as any type of device or devices configured for short-term or long-term storage of data such as, for example, memory devices and circuits, memory cards, hard disk drives, solid-state drives, or other data storage devices. As discussed in detail below, the IAVAS 102 may store inputs, data, etc. received from control 108, user interface 112, peripheral device(s) 118, and/or remote servers 106 in the data storage 110. As discussed in more detail below, the data may be generated by controller 108 to be stored in the data storage 110. In some embodiments, the data storage 110 may include an application or extension 126 that is installed on the IAVAS 102. The application 126 may be further utilized by IAVAS 102 to interact with the remote servers 106.

The user interface 112 may be embodied as any type of device or devices configured to receive an input from a user such as, for example, a touch screen, a keyboard, microphone, or any other input device to receive an input from the user. In one embodiment, the IAVAS 102 may be embodied as a smartphone and the user interface 112 may be embodied as a keyboard displayed on the touchscreen of the smartphone to receive inputs from the user. Furthermore, the user interface 112 may be a combination of several input devices to receive inputs from the user.

The output unit 114 may be embodied as any type of device or devices configured to send an output to the user such as, for example, a speaker. In other embodiments, the output unit 114 may also include a display to display the contents on the IAVAS 102. In other embodiments, the display may be incorporated into the user interface 112, such as, a touch screen as discussed above. In other embodiments, the display may be separate from both the user interface 112 and output unit 114. The output unit 114 outputs the audio for the IAVAS 102 to implement the IAVAT 100.

The communication system 116 may be embodied as any type of communication circuit, device, or collection thereof, capable of enabling communications between the IAVAS 102 and other devices of the IAVAT 100 (e.g., the remote servers 106 via the network 104). To do so, the communication system 116 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 118 may include any number of input/output devices, interface devices, and/or other peripheral devices. For example, the peripheral devices 118 may include a display and graphics circuitry and, in some embodiments, may further include a keyboard, a mouse, audio processing circuitry (including, e.g., conventional amplification circuitry and one or more speakers), and/or other input/output devices, interface devices, and/or peripheral devices.

The network 104 may be embodied as any type of network capable of facilitating communications between the IAVAS 102 and the remote servers 106. For example, the network 104 may be embodied as, or otherwise include, a wired or wireless Local Area Network (LAN), a wired or wireless Wide Area Network (WAN), a cellular network, and/or a publicly-accessible, global network such as the Internet. As such, the network 104 may include any number of additional devices, such as additional computers, routers, and switches, to facilitate communications thereacross.

The remote server 106 may be embodied as any type of computation or computer device capable of performing the functions described herein including, without limitation, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. It should be appreciated that the remote server 106 may be embodied as a single compute device or a collection of distributed compute devices and may include components, such as a controller 130 that includes a processor 132 and a memory 134 and a data storage 136, similar to the IAVAS 102, the description of which is not repeated herein for clarity of the description. The remote server 106 may include specific data to implement IAVAT 100. For example, the remote server 106 may store audio and text to implement the IAVAT 100, such as pre-recorded audio stored in data storage 136 to be accessed by the IAVAS 102 to be played back to the user.

As explained in connection with the implemented example of the IAVAT 100 illustrated in FIGS. 2A-2D, FIGS. 2A-2D illustrate example displays of the IAVAS 102 during implementation of the IAVAT 100. During initiation of a process of using IAVAT 100, the IAVAS 102 retrieves various input text descriptions 202a-202d and input fields 204a-204d from a remote server 106. The display of the IAVAS 102 shows an example web page that contains the input text descriptions 202a-202d and the input fields 204a-204d. In the embodiment shown in FIGS. 2A-2D, there are only four different input text descriptions 202a-202d and four different input fields 204a-204d. However, it would be apparent to one of ordinary skill in the art that there can be any amount of input text descriptions and input fields. The input text descriptions 202a-202d may describe the correlated input fields 204a-204d. For example, input text description 202a may correlate to input field 204a to describe what information is requested by the input field 204a.

The input fields 204a-204d may contain required information or optional information to be filled out by a user to perform a request. The required information may be personal information to identify a user or it may be payment information or any other information required to perform the request. For example, the request may be embodied as a sales transaction (e.g., purchasing products online and checking out with a sales cart) or filling out a form (e.g., signing up for a membership) or any other request that may necessitate filling out input fields that contain required information.

Each pair of input text descriptions 202a-202d and input fields 204a-204d may have a variable assigned to differentiate one pair of input text description 202a and input field 204a from another pair of input text description 202b and input field 204b. The assigned variable may be stored on the remote server 106 and also on the IAVAS 102. Whenever a user initiates the process of using IAVAT 100, the IAVAS 102 may also automatically check to determine whether there is any required information stored in the data storage 110 that matches one or more pairs of the input text descriptions 202a-202d and the input field 204a-204d through a comparison of assigned variables. In other embodiments, the IAVAS 102 may only check to see if there is any required information stored in the data storage 110 that matches one or more of the input fields 204a-204d through a comparison of assigned variables. For example, remote servers 106 that implement IAVAT 100 may store, in the data storage 136, an input text description 202a and input field 204a with an assigned variable of "A," which correlates to a first name of the user. If the user has previously filled out an input field 204a with the appropriate required information, the IAVAS 102 may store the required information with the assigned variable "A" to be used for an autofill feature.

The autofill feature may auto-populate the input fields 204a-204d by matching the assigned variables of at least one of the input text descriptions 202a-202d or the input fields 204a-204d to the required information stored in the data storage 110 of the IAVAS 102. The autofill feature reduces the time it takes the user spends on filling out the input fields 204a-204d by reusing the information stored for the user. In some embodiments, the IAVAT 100 may generate several profiles for a IAVAS 102 for an instance that several users may use IAVAS 102, such as, a family using one computer to sign up for various services and memberships. The generated profiles may provide an autofill feature for the users that implement IAVAT 100.

In accordance with at least one embodiment, the plurality of remote servers 106 may standardize input text descriptions 202a-202d and input fields 204a-204d to assign the same variable for the same input text descriptions 202a-202d and input fields 204a-204d. For example, one remote server 106 may assign the same variable "A" to the input field 204a for "First Name," which may enable matching required information across all remote servers that implement IAVAT 100. Thus, in such an implementation, the variable A may be pre-populated in the field 204a (e.g., providing auto-fill functionality in a new and unconventional manner) based on conventional cookie, or other technology that enables the IAVAT 100 to recognize the user entering data in the field 204a on various websites.

Figure 2A:
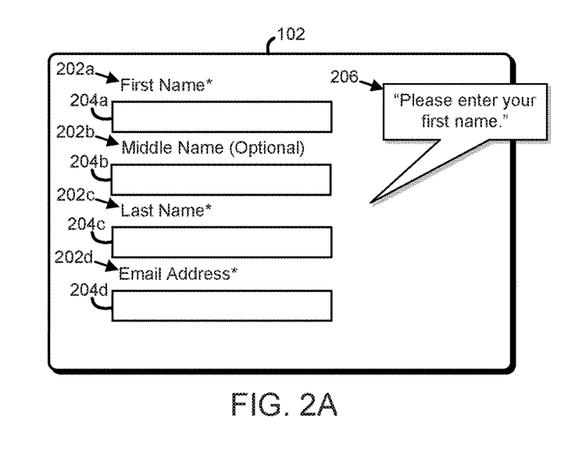
FIGS. 2A-2D illustrates one example of implementing the interactive audio validation and assistance system of FIG. 1.

During implementation of the IAVAT 100, after initiation and checking for required information stored in the data storage 110 of the IAVAS 102, the IAVAS 102 may first begin by requesting input from the user to fill in the first input field 202a by producing an audible explanatory instruction 206 to facilitate input of the missing information as shown in FIG. 2A. The IAVAS 102 may output the instruction 206 through the output unit 114. Furthermore, the IAVAS 102 may output the instruction 206 with a combination of an audible instruction 206 and text instruction. The audio output from the output unit 114 may be customized for the user to facilitate better interaction with the user. A default audio profile may be selected based on parameters identified by IAVAT 100 based on location, nationality, gender, and/or any other parameters to determine an audio profile to implement the IAVAT 100 for the user. The audio profile contains characteristics of the audio generated by the IAVAT 100 such as voice type (e.g., man, woman, child, accent, etc.) and language. An audio profile may be selected by the user and the settings may be stored on the IAVAS 102.

In some embodiments, the IAVAS 102 may initiate a process of filling out the input fields 204a-204d by providing a web page description for all of the input fields 204a-204d. For example, the IAVAS 102 may provide information to aid the user to fill a web page containing the input fields 204a-204d. In some embodiments, there may be only one input field 204a to be filled on a web page. In other embodiments, any number of input fields 204a-204d may be on a web page.

Figure 2B:
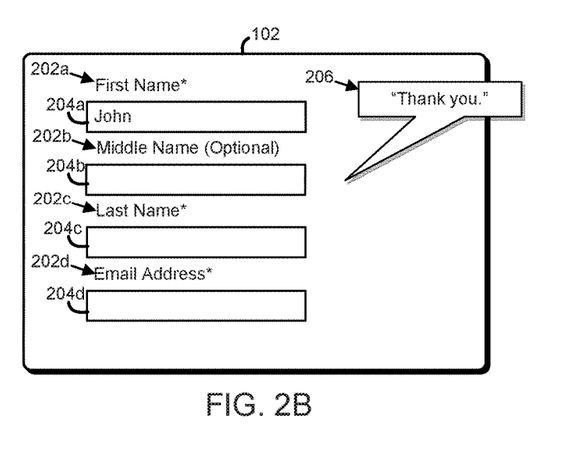

In response to the user inputs the required information for the input field 204a as requested by the audible explanatory instruction 206, the IAVAS 102 may provide a response of acknowledgement 206 to confirm the IAVAS 102 received the input from the user as shown in FIG. 2B. The acknowledgement 206 allows for the user to recognize that the IAVAS 102 received the input from the user. In some embodiments, the acknowledgement may include a recitation of the input by the user such as reiterating a name that was input into the input field 204a.

Figure 2C:
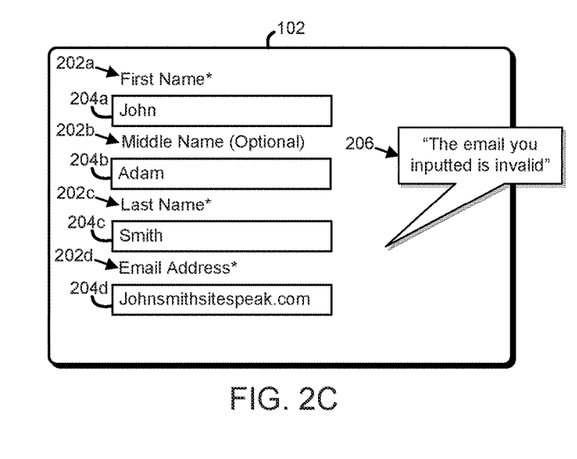

Continuing the process of filling out the input fields 204a-204d, the IAVAS 102 validates each input from the user to determine if the input completes required information for the input field 204a-204d that is being addressed. In response to detecting that an input does not complete required information for an input field 204d, the IAVAS 102 outputs a notification 206 that the required information is invalid as shown in FIG. 2C. The IAVAS 102 may determine the required information is invalid by determining if required information is missing or in an incorrect format for the one or more input fields 204a-204d.

Figure 2D:
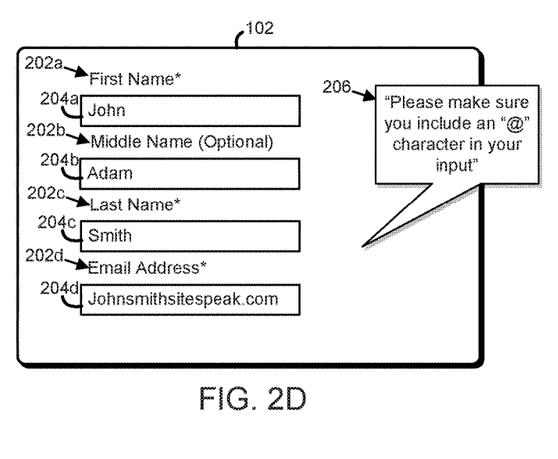

After the IAVAS 102 determines that the required information in the input field 204a is invalid, the IAVAS 102 may provide a further explanatory instruction 206 to help facilitate input of the incorrect format information as shown in FIG. 2D. For example, the system IAVAS 102 may detect that the input is missing a "@" character and is determined to be invalid. The IAVAS 102 may further detect inputs that differentiate from standard inputs, such as, all numbers for a phone number or search for a valid address if an address was requested from the user.

The notification 206, acknowledgement 206, instruction 206, or any other output from the IAVAS 102 to facilitate the inputting the required information for the input fields 204a-204d may be provided by the IAVAS 102 to the user in an audible volume and also in a text box format. The amount of notifications 206, acknowledgements 206, or instructions 206 may be adjusted to determine how much audio validation and assistance is needed.

Figure 3A:
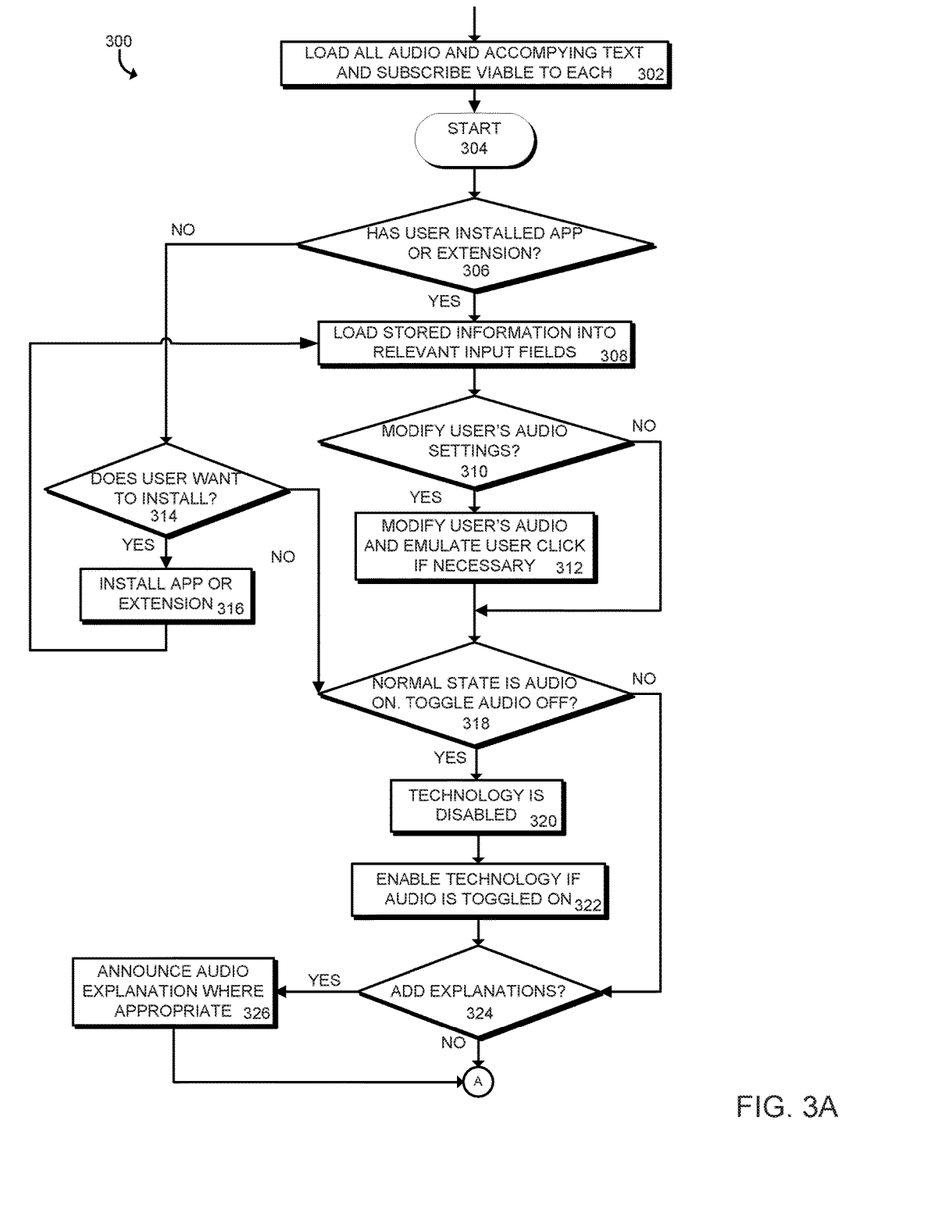
FIGS. 3A-3C illustrate one example of feature functionality that enables interactive audio validation and assistance to website visitors filling our on-line web forms.
Figure 3B:
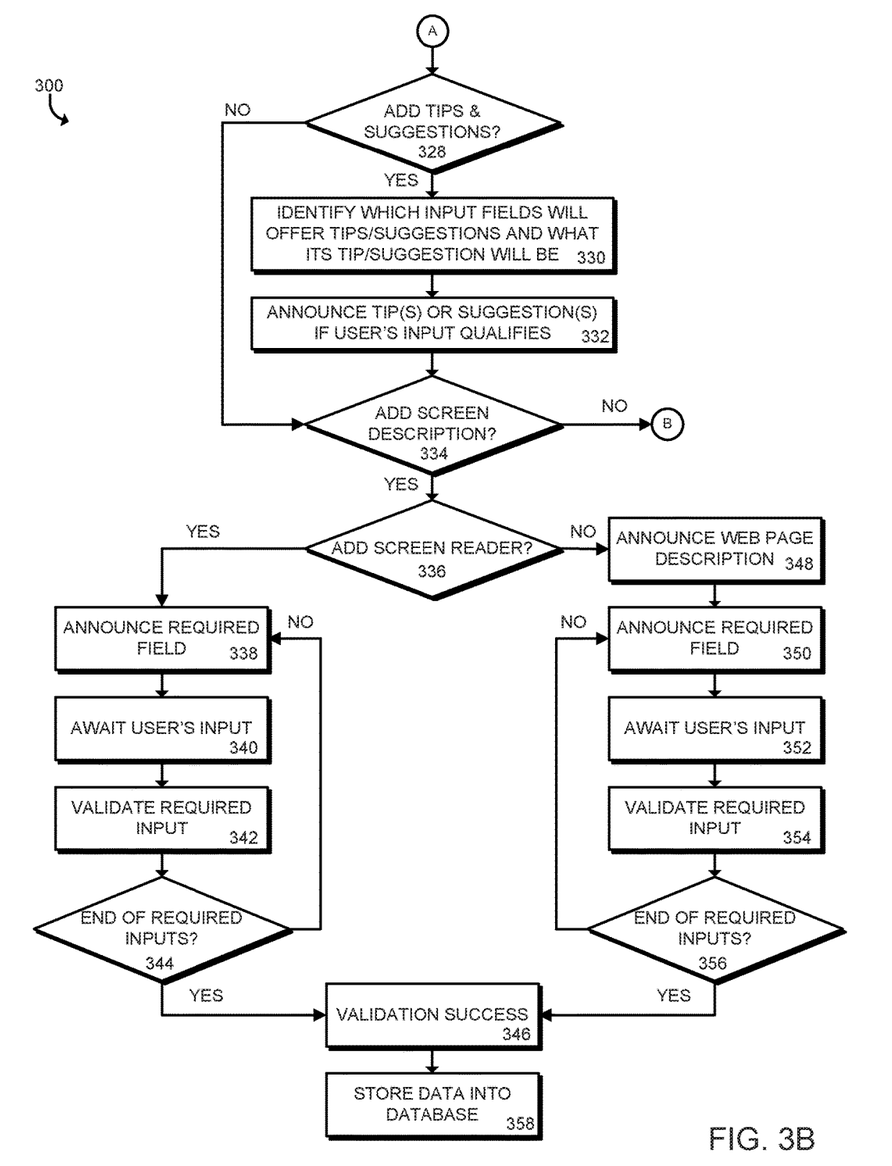
Figure 3C:
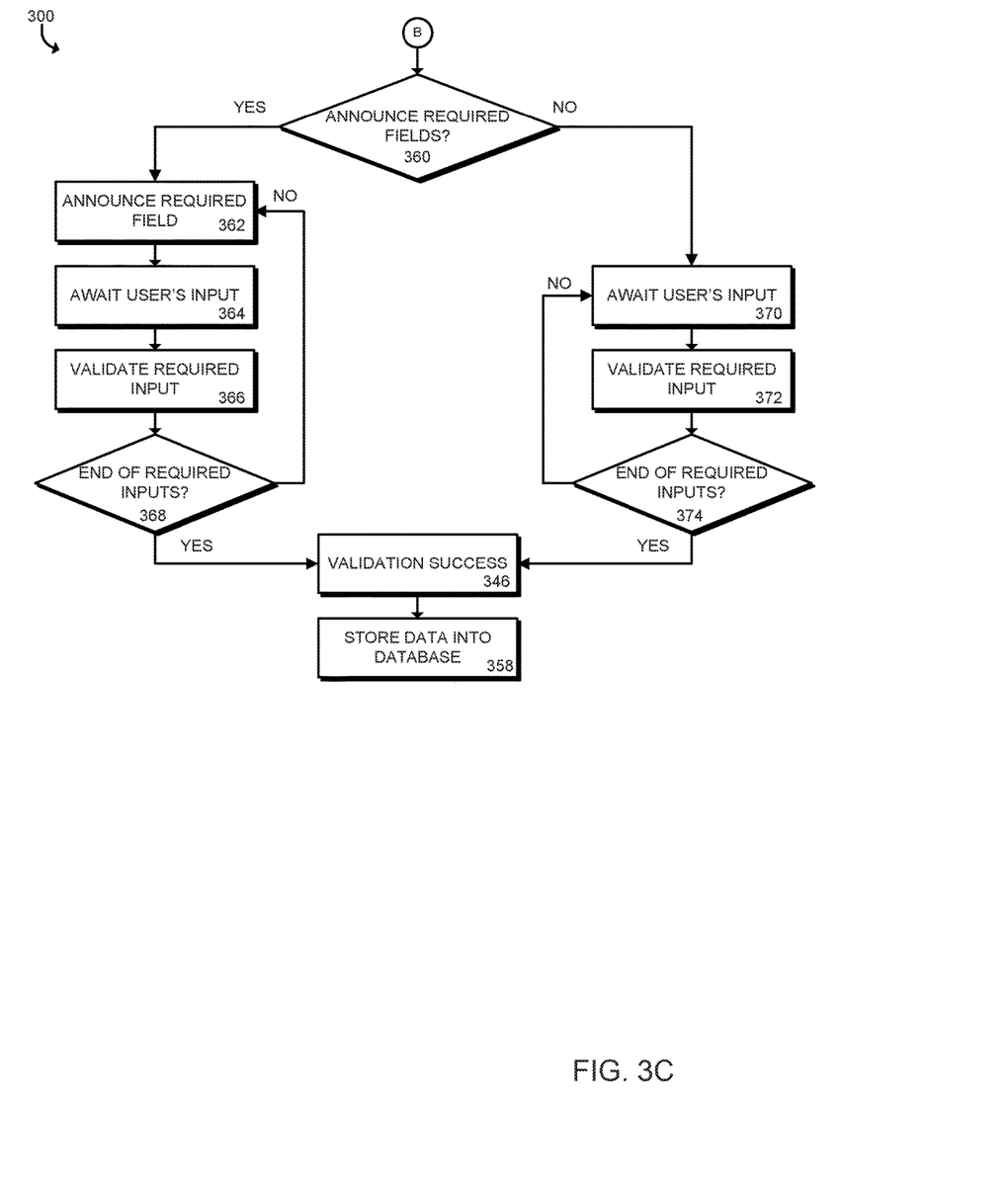

FIGS. 3A-3C illustrate an example of feature functionality that enables interactive audio validation and assistance to website visitors filling our on-line web forms. In accordance with at least one embodiment, particular utility may be provided for serving webpages to mobile or other devices with slow internet connections; for example, it may be beneficial to initiate loading audio only on the page the user is on so that the loading of the audio does not delay user's ability to start filling in forms on that particular page. As explained in connection with the flow chart illustrated in FIGS. 3A-3C, one implementation of the disclosed embodiments may provide a method of operating an IAVAS that begins at 302, wherein a website of a server loads audio and accompanying text to the IAVAS from a data storage and subscribes or assign a variable to each. It should be understood that this may or may not involve loading audio for all text upon which a user is viewing. Control of IAVAS then proceeds to 304, at which operations associated with serving an enhanced website of the server begin.

An application and/or extension (for example, as illustrated in FIG. 1) may be provided for that IAVAT which enables the IAVAT to ask permission to control user's audio on their IAVAS or computing device. Control then proceeds to 306 at which a determination is made, whether a user has installed the application 126 or extension 126 onto the IAVAS 102. If so, control may proceeds to 308 at which the computing device may check data storage 110 to optionally determine whether any information may be used to autofill the relevant input fields as described above.

After the check and autofill process, control proceeds to 310 at which a query requesting permission to control a user's audio may be output to the user. If permission is granted, control proceeds to 312 at which the application or extension may modify the audio of the user's computing device to ensure that audio is not muted and/or at a level deemed audible based on predetermined values. After permission is granted, the user may set a permanent authorization to prevent the need to constantly request permission when going through the process. The user may set a predetermined audio level that is calibrated to the user, such as a volume at a specific level that the user is comfortable hearing audio generated by IAVAT.

In some embodiments, the computing device may also emulate a user click to enable audio. In accordance with at least some of these embodiments, such functionality may be necessary to allow/enable audio to be output on certain devices). In some embodiments, the installation of the application or extension may provide an authorization to modify the audio of the user's computing device. After modification of the user's audio of the computing device, control then proceeds to 318.

If, at 306, no application or extension is installed onto the computing device, control proceeds to 314 at which there is a query by the computing device to determine whether the user would like to install the application or extension. If so, control proceeds to 316 where an application or extension is installed on the computing device and control proceeds to 308. If, at 314, the user does not want to install the application or extension, control proceeds to 318.

If, at 310, no permission is granted by the user to modify the audio of the user's computing device, control proceeds to 318.

It should be understood that the operations performed at 306-312 may be substituted for an operation in which a user logs onto or visits a website of a server, e.g., a remote server, fitted with IAVAT 100 and an opening message is output to the user via audio through the output unit if the sound on their computing device is not muted. This message or any other may or may not be accompanied by a text message. Appendix A includes an example of software code (written in Javascript with reference to jQuery) used to perform the operations performed at 312.

Thus, it should be understood that alternative operations may be performed in accordance with disclosed embodiments of the invention. For example, disclosed embodiments may query/notify a user to unmute their computing device to take advantage of the functionality provided by the disclosed embodiments to interactively assist in on-line form completion.

At 318, it is determined whether a user has turned off the IAVAT. If the IAVAT is left on, control proceeds to 324. Otherwise, control proceeds to 320, at which the a portion of the IAVAT may be optionally disabled and monitoring may be performed at 322 to determine whether the IAVAT has been turned back on and when the IAVAT is turned back on, control proceeds to 324. More specifically, it should be understood that, optionally, only audio output may be disabled while the remaining IAVAT technology continues to run.

In some embodiments, the user may toggle the audio of the computing device off when the volume of the output unit of the computing device is below a predetermined value, such as a volume that would not be audible for the user or below a value set by the user.

At 324, the user can turn off the "Add Explanations" feature of IAVAT. If that feature is turned off, control proceeds to 328. Otherwise, control proceeds to 326, at which the "Add Explanations" feature is turned on, whereby audio explanations are announced as indicated. The explanations may be an audio description of the input field that the user is currently filling out. In some embodiments, the explanations may be given after a predetermined amount of time has passed in which the user initiated filling out the input field. For example, if it is detected no input has been received after the user has proceeded to an input field (clicking on the input field with a cursor or touchscreen) for, for example, five seconds, then the computing device may output an explanation to the user. In other embodiments, the explanation may be given automatically when the user clicks on the input field.

At 328, the user can turn off the "Add Tips and Suggestions" feature of IAVAT. If the "Add Tips and Suggestions" feature is turned off, control proceeds to 334. Otherwise, control proceeds to 330, at which identification of which non-required fields will offer "Tips and Suggestions" Audio Tips and Suggestions and their variables is performed.

Control then proceeds to 332, at which everywhere a user's input qualifies, "Tips and Suggestions" will be announced. For example, the computing device may detect that there may be a missing character for an input field that may be essential for the required information, such as the "@" character for an email address.

Control then proceeds to 334, at which a user can turn off the "Add Screen Descriptions for Sight impaired, Mobile or Desktop users" feature of IAVAT 100. If this feature is turned off, control proceeds to 360. Otherwise, control proceeds to 336, at which a determination is made whether the "Add Screen Descriptions for Sight impaired, Mobile or Desktop users" feature of the IAVAT is on, and whether the user is employing a screen reader. If a determination is made that no screen reader is being used, control proceeds to 348. Otherwise, control proceeds to 338, at which required fields are announced where appropriate.

Control then proceeds to 340, at which the technology awaits user's input to required field(s). Control then proceeds to 342, at which the user's input is validated. Appendix B includes an example of software code (written in Javascript with reference to jQuery) for performing the operations for validation at 342 (and elsewhere, in which validation of required field input is performed).

Control then proceeds to 344, which begins an iterative cycle of operations at 338-342 is performed ending at 344 once all required fields have been validated at 346.

If it is determined that no screen reader is being used, then at 348, web page descriptions are announced and control proceeds to 350, at which required fields are announced as appropriate. Control then proceeds to 352 at which the technology awaits user's input to required field(s). Control then proceeds to 354 where validation of the user's input for the required field(s) is performed and an iterative cycle of operations at 350-354 is performed ending at 356 once all required fields have been validated at 346.

At 360, it is determined whether "Screen Descriptions—Announce Required Fields" feature is on or off. The user can turn off the "Announce Required Fields" feature of the IAVAT. If the "Announce Required Fields" feature is turned off, control proceeds to 370.

Alternatively, if the feature is turned on, control proceeds to 362, at which required fields are announced where appropriate. Control then proceeds to 364, at which monitoring is performed for a user's input to a required field. Control then proceeds to 366, at which the user's input is validated and an iterative cycle of operations at 362-366 is performed ending at 368 once all required fields have been validated at 366.

At 370, monitoring is performed to monitor for a user's input to required fields. Control then proceeds to 372 at which the user's input is validated and an iterative cycle of operations at 370-372 are performed ending at 374 once all required fields have been validated at 372.

After all required fields have been validated at 346, control proceeds to 358, at which the computing device stores the data of gathered required information in the input fields into the data storage of the computing device to be subsequently used by the computing device for an autofill feature implementing the IAVAT. In some embodiments, the computing device may store the data as cookies or by other methods to be accessed by the remote servers.

While the concepts of the present disclosure are susceptible to various modifications and alternative forms, specific embodiments thereof have been shown by way of example in the drawings and described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

For example, in accordance with at least some embodiments, in addition to offering IAVAT for website owners to hard code on their website, IAVAT may be implemented as a plug in for website owners/operators to install. Accordingly, a website owner/operator may communicate with an IAVAT server over the Internet and define the items to announce, the fields to validate, as well as other implementation details of IAVAT described above. In turn, the website owner/operator may be able to pick audio from a library and associate that audio with fields or user's actions in his website. He may also select options that enable the ability to choose to: 1) use auto generated audio; 2) select audio language and/or select the specific or type of language to be used based on the user's location; 3) install A/B testing which may collect data including, but not limited to, which fields are most commonly not validated on the first attempt, the difference IAVAT made on form completion, and other user actions.

In such implementations, the website owner/operator may be able to visit the IAVAT server to collect this data. The data will show the website owner/operator friction points for his users so that he can modify his website. The plug in installation may be accomplished by adding only a single line or multiple lines of code to the headers (or footers) of pages where IAVAT is to be employed. Once installed, either in advance, or in real time, the website can query the IAVAT server to enable the IAVAT functions.

Further, in accordance with at least some embodiments, as discussed briefly above, the IAVAT application (and corresponding IAVAS) may enable the ability for a user to select an option which overrides a website's existing text error notification and replaces it with an IAVAT-text notification. Similarly, a website owner may make this same election. Such a configuration may enable the functionality wherein, in real time, a user's browser may be used to monitor a visited website for an audible alert such as a "ding.". In response to detection of such an audible output, the IVAT application may work with the browser to identify a change in state on the displayed screen, which may, in all probability, indicate a text error message is being displayed.

Such functionality can provide increased utility in various different scenarios. For example, consider a first scenario in which the IVAT application controls or cooperates with the browser to detect and locate the change, perform a search within a text library accessible to the application, extension or browser to identify keywords that may be or are associated with the change. Such a library may have various permutations, e.g., "First Name," "Name," "Street Address," "Street Number," "Street Name," "Email," "Declined" or a match of more than one word (for example, a variable and a modifier, e.g., "Card number & Valid", Expiration & Incorrect," etc.). In accordance with such an implementation, detection of matching or related data within the library may trigger output of appropriate audio, e.g., information indicating what the likely basis for the website outputting the audible alert is.

Alternatively, or in addition, consider the scenario in which a browser provider publishes a standardized list of variable names for various text error messages. In such situations, based on presently disclosed embodiments, website owners/operators can change variable names to match that standardized list. Accordingly, software logic can proceed as above except with 100% accuracy. As a result, a website owner/operator may also insert a line of code where the error message is triggered to alert the browser to an error and eliminate the necessity of monitoring for a "ding". Moreover, a website owner/operator may also be able to select the audio to be used from the library which would be triggered by the line of code above. In either scenario, control then proceeds to field validation as explained previously.

In such an implementation, optionally, the cooperation of the browser and the application may provide a user with settings in the browser much like what is in the application and/or extension.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

APPENDIX A

```
//... Audio initialization code
//Step 1 code
function step_1_begin( ){
    $('.megaphone').css('left','142px'); //reposition Spokesman + mute button on page
    $('.cartoon').css('left','-300px');
        setTimeout(function( ){
            tip('Step 1, Tell me about your order.','default'); //message in Spokesman bubble
            play_message('step_1.mp3');          //play audio
        } , 500);
//navigate to first input that is required + blank
    $('.step1-input').focusin(function( ){
        if($(this).attr('tabindex') <$('.top_priority:first').attr('tabindex') )
        {
          return false;
        }
        if( $(this).hasClass('top_priority') )
        {
          return false;
        }
        else
        {
          $('.top_priority:first').focus( );
            return false;
        }
    });
    $('.step1-input').focusout(function( ){
        if(! $(this).hasClass('top_priority') )
        {
          return false;
        }
    });
}
```

APPENDIX B

```
//Phone validation
function phoneValid(p) {
    var phoneRe = /^[2-9]\d{2}[2-9]\d{2}\d{4}$/; //match phone number against regex pattern
    var digits = p.replace(/\D/g, "");
    return (digits.match(phoneRe) !== null);
}
//Vaildate phone number when user exits out of text input
$('input[name=day_phone]')focusout(function ( ) {
    if( !$(this).hasClass('top_priority') )
    {
      return false;
    }
    var phone=$(this).val( );
    $('.pre-day').html($(this).val( ));
    if (phoneValid($(this).val( )) == true) {
        tip('Continue with your order','default'); //Spokesman's tip
        $(this).closest('.form-group').removeClass('has-error').addClass('has-success');
        $(this).removeClass('top_priority');
        $(this).removeClass('not_valid');
        set_next_priority( );
```

APPENDIX B-continued

```
    } else {
        $(this).closest('.form-group').addClass('has-error');
        ding( );
        tip('I need your Phone Number','error'); // Spokesman's tip ERROR
        play_message('day_phone.mp3'); //PLAY AUDIO MESSAGE
        $(this).addClass('top_priority');
        $(this).addClass('not_valid');
        $(this).focus( );
    }
});
```

I claim:

1. An interactive audio validation and assistance system for providing an assistive service for aiding a user in filling one or more fields of an online request form, the system comprising:
- a user interface to receive user input to fill the one or more fields of the online request form;
- an output unit to output a notification and audible explanatory instructions to a user;
- a data storage to store at least one pre-recorded audio message that includes the audible explanatory instructions for output via the output unit;
- an application or an extension which enables the interactive audio validation and assistance system to modify a volume of the output unit; and
- a controller configured to:
  - determine whether the application or extension is installed;
  - request, in response to a determination that the application or extension is installed, permission to modify the volume of the output unit;
  - control the application or extension to modify, in response to permission being received from the user to modify the volume of the output unit, the volume of the output unit;
  - validate one or more fields of the online request form that require information for completing the online request form by determining whether user input in the one or more input fields of the online request form that require information for completing the online request form is complete and in a correct format; and
  - automatically control the output unit to, in response to a determination that user input is incomplete or in an incorrect format for at least one of the one or more input fields of the online request form that require information for completing the online request form, output a notification that the received user input is incomplete or in an incorrect format and output the audible explanatory instructions that facilitate input of user input that is complete or in a correct format for the at least one of the one or more input fields of the online request form that require information for completing the online request form.

2. The interactive audio validation and assistance system of claim 1, wherein the audible explanatory instructions comprise at least one of one or more explanations, one or more tips, one or more suggestions, specific descriptions of types of invalid data entry, or a screen description.

3. The interactive audio validation and assistance system of claim 1, wherein the controller is further configured to assign a variable to the one or more input fields and input to fill the one or more input fields to match required information that completes the one or more input fields to the one or more input fields to enable storage and auto fill of data that is browser independent.

4. The interactive audio validation and assistance system of claim 3, wherein the data storage stores the required information that completes the one or more input fields and the assigned variable for the required information.

5. The interactive audio validation and assistance system of claim 4, wherein the user interface is further configured to auto fill the one or more input fields that matches the assigned variable of the required information stored in the data storage in response to an initiation of a process of filling one or more input fields.

6. The interactive audio validation and assistance system of claim 1, wherein storage of the at least one pre-recorded audio that explains the one or more input fields in the data storage is performed in response to selection of audio from a library and associating that audio with one or more input fields.

7. The interactive audio validation and assistance system of claim 1, further comprising a screen reader to explain the one or more input fields, wherein the at least one pre-recorded audio is disabled in response to utilization of the screen reader.

8. The interactive audio validation and assistance system of claim 1, wherein the system is configured to work with a browser to identify a change in state on a displayed screen of the user interface, wherein the change in state is indicative of a text error message being displayed.

9. An interactive audio validation and assistance method for providing an assistive service for aiding a user in filling one or more fields of an online request form, the method comprising:
- receiving, via a user interface, user input to fill the one or more fields of the online request form;
- outputting, via an output unit, a notification and audible explanatory instructions to a user;
- storing, in a data storage, at least one pre-recorded audio message that includes the audible explanatory instructions for output via the output unit;
- enabling the interactive audio validation and assistance system to modify a volume of the output unit using an application or an extension;
- determining whether the application or extension is installed;
- requesting, in response to a determination that the application or extension is installed, permission to modify the volume of the output unit;
- controlling the application or extension to modify, in response to permission being received from the user to modify the volume of the output unit, the volume of the output unit;
- validating one or more fields of the online request form that require information for completing the online request form by determining whether user input in the one or more input fields of the online request form that require information for completing the online request form is complete and in a correct format; and automatically controlling the output unit to, in response to a determination that user input is incomplete or in an incorrect format for at least one of the one or more input fields of the online request form that require information for completing the online request form, output a notification that the received user input is incomplete or in an incorrect format and output the audible explanatory instructions that facilitate input of user input that is complete or in a correct format for the at least one of the one or more input fields of the online request form that require information for completing the online request form.

10. The interactive audio validation and assistance method of claim 9, wherein the audible explanatory instructions comprise at least one of one or more explanations, one or more tips, one or more suggestions, specific descriptions of types of invalid data entry, or a screen description.

11. The interactive audio validation and assistance method of claim 10, further comprising assigning a variable to the one or more input fields and input to fill the one or more input fields to match required information that completes the one or more input fields to the one or more input fields to enable storage and auto fill of data that is browser independent.

12. The interactive audio validation and assistance method of claim 11, wherein the data storage stores the required information that completes the one or more input fields and the assigned variable for the required information.

13. The interactive audio validation and assistance method of claim 12, wherein the user interface is further configured to auto fill the one or more input fields that matches the assigned variable of the required information stored in the data storage in response to an initiation of a process of filling one or more input fields.

14. The interactive audio validation and assistance method of claim 9, wherein storage of the at least one pre-recorded audio that explains the one or more input fields in the data storage is performed in response to selection of audio from a library and associating that audio with one or more input fields.

15. The interactive audio validation and assistance method of claim 9, further comprising, explaining the one or more input fields with a screen reader, wherein the at least one pre-recorded audio is disabled in response to utilization of the screen reader.

16. The interactive audio validation and assistance method of claim 9, further comprising working with a browser to identify a change in state on a displayed screen of the user interface, wherein the change in state is indicative of a text error message being displayed.

* * * * *